United States Patent Office 2,951,755
Patented Sept. 6, 1960

2,951,755

FERTILIZERS AND METHOD OF MAKING SAME

Jacob S. Joffe, New Brunswick, N.J., assignor of thirty-three and one-third percent to George S. Pfaus, Hopewell, N.J., and thirty-three and one-third percent to Reuben A. Posner, New York, N.Y.

No Drawing. Continuation of application Ser. No. 297,995, July 9, 1952. This application Dec. 10, 1958, Ser. No. 779,280

4 Claims. (Cl. 71—6)

My invention relates to new and improved fertilizers and a method of making the same. The invention covers the new fertilizers, irrespective of the method or methods for making them. The improved fertilizers include materials of organic origin and inorganic materials.

This application is a continuation of my prior U.S. application, Serial No. 297,995 for Fertilizers and Methods of Making Same, allowed August 25, 1958.

According to the invention, physical and chemical and biological reactions are used, in order to react the starting ingredients, so that the end-products are not merely mixtures of the starting ingredients. The new fertilizers thus have entirely new and physical and chemical and biological properties.

As examples of natural organic starting materials, and without limitation thereto, reference is made to animal manure such as fecal matter and urine and mixtures of fecal matter and urine; fecal matter or urine or both, intermixed with straw, sawdust, peat moss, or other adsorbent cellulosic and related material; peat; sludge and sewage; coffee grounds; food residues; decayed foods; straw; hay, including spoiled hay; corn cobs; banana stalks; residues from slaughtered animals; etc.

The heretofore practiced methods of handling or processing organic fertilizer materials, such as animal manures, for use as plant nutrients, have been wasteful and frequently detrimental to the crop. These disadvantages are minimized or eliminated by the invention and numerous important advantages secured.

According to my invention, I heat-convert the organic material, preferably as soon as it is excreted or otherwise available, in a conventional drier to a temperature at which the original water soluble and dispersible organic colloidal material is heat-converted to the irreversible state, in which such heat-converted and irreversible organic colloid material becomes substantially non-dispersible and insoluble in water. At least 50–60 percent by weight of the original water-dispersible and water-soluble organic material cannot be extracted by water from said heat-converted material in an ordinary quick test extraction. This range of 50% to 60% of heat-conversion is preferred and highly desirable, instead of heating the material until all of the original water-soluble colloids are heat-converted to the substantially water-insoluble condition. The non-water-dispersible part of the material is also affected by the heating process, so that when tested with a 0.2% solution of sodium hydroxide less of the organic material goes into solution per unit time than the unheated insoluble organic material. In the soil, the non-water-soluble part cannot be attacked as readily or quickly by the microorganisms and hence will be available in the soil for a longer period and will not release excessive amounts of carbon dioxide at any one time.

To enhance the irreversibility of the soluble organic colloids and to advance coagulation, the wet material on the way to the drier is dusted with 50–60 pounds of gypsum per ton of the organic material. The original fertilizer material is thus modified so that calcium organic compounds are formed, known as humates of calcium, become insoluble in water when the modified organic fertilizer material is dried and heated, thus preserving the organic matter for future use. The coagulation effect of the gypsum per se adds to the irreversibility of the colloids and their stability towards decomposition. The calcium humates which are thus formed, are also designated as organic fertilizer material for the purposes of defining the invention in the claims.

This heat-converted material is substantially sterile, and it is sufficiently dehydrated so that it can be ground and stored for use as such and as base material for the manufacture of the new type of organo-mineral fertilizer and soil improving conditioners.

In the old fashioned way of storing and preserving organic fertilizer materials, large quantities of valuable constituents are lost. The wet material is often infested with pathogenic microorganisms and parasites which infect the objects with which they come in contact and are a danger to the health and life of the human and some domestic animals. Said wet material carries all kinds of weeds and serves as a breeding place for insects.

Organic fertilizer material prepared by conventional methods contains a large percentage of water. On the average, fresh animal manures contain 65% to 80% of water by weight. Organic fertilizer materials also contain water-soluble organic colloids. Animal manures may have as much as 5% to 7% and up to 10% by weight of these water-soluble colloids. Under conditions of old-time methods of manure storage or in composting manure or any other organic fertilizer material, these valuable colloids are lost by leaching or decomposition. When fresh manure is incorporated into the soil, the water-soluble colloids diffuse into the soil and are easily and rapidly decomposed. This results in the evolution of excessive amounts of carbon dioxide, which is apt to poison the roots and prevent the roots from getting the necessary supply of oxygen. The valuable carbon dioxide and organic material per se are, as a rule, wasted by volatilization and leaching, with very little use to the plants growing in that soil. At the same time, the bulk of the solid fresh organic matter, having lost its excess of water (as the water-soluble colloids diffuse into the soil), changes from an anaerobic to an aerobic state and is rapidly decomposed in the same manner as the water-soluble organic colloids, as previously described. The net result of handling organic fertilizer material, as illustrated by the incorporation of fresh manure into the soil, is a tremendous waste, a system contrary to the principles of conservation.

The said base material is mixed with one or more inorganic plant nutrients, such as inorganic salts, depending on whether a complete fertilizer is to be produced or a single or double element fertilizer is to be produced. As later disclosed, this base material is in the form of substantially dry particles or uncaked particles when said mixture is formed. While mixing said materials, water in the form of a spray is introduced. The inorganic salts are dissolved in the water and thus react with the moistened organic material to produce separate granules, the reaction coming to a halt when the granules are dried. The purpose of spraying water on the surface of the particles is to provide a surface reaction between the moistened particles and the inorganic fertilizer salts. Before reaching that stage, the reacting mixture is dusted with a fine powder of the organic material in order to coat the exposed salt crystals. The mixture is then covered with a surface layer of coating material which is slowly permeable to water. When added to the soil, the coating of the granules as well as the rest of the heat-dried material with their specific properties of permability, enhance the reactions, which are initiated at the time of mixing prior to the drying. These reactions bring about physical, chemical, and physico-chemical changes whereby the leaching of the plant nutrients is retarded and the release of these for the use of the plants is controlled and regulated.

In another aspect of the invention, I blend said inoculated ground material uniformly and intimately with liming ingredients, with or without some of the organo-mineral fertilizer.

Numerous other features of the invention are stated below.

Without limitation thereto, a preferred embodiment of the invention is stated below.

STEP NO. 1

This example applies particularly to treating animal manure. The starting organic fertilizer material, such as animal manure or other organic fertilizer material, is substantially dehydrated so that it remains stable, by heating it at a temperature at which the aforesaid 5% to 7% and as much as 10% water soluble (of total organic matter) colloidal material is heat-converted to become irreversible, so that the bulk of such water-soluble colloidal material is not subsequently extracted by water. As above noted, the heat may convert 50%–60% by weight of the water-soluble colloids to the water-in-soluble state.

The action of heating and drying also makes the original residual insoluble organic matter of manure or any other source of organic matter still more insoluble. This acquired property, as a result of heating and drying, may be demonstrated chemically, using the above-mentioned 0.2% aqueous solution of sodium hydroxide, or biologically. The latter demonstration or test is made by inoculating fresh or composed manure and heat-dried manure by one and the same microbial culture. The heat-dried manure will release 30% to 50% less of carbon dioxide for any given time period and the rate of release will be much slower.

For this purpose, for example, the starting material may be heated at a temperature of about 1800° F. at its entry into the drum of the dried and it may be discharged at a temperature of about 400° F. This heating wholly or substantially wholly kills all the microorganisms in the starting material.

The heat-converted and dehydrated material which results from this heating and drying step preferably contains 15% to 20% of water by weight. The percentage of water is selected so as to be below the percentage at which microorganisms can attack the heat-converted and dried material. The material which results from this heating and drying operation is preferably and optionally fed immediately, while still at the heating temperature, to a grinder. The heated and dried material may be ground at any temperature. There is little or no loss of material by reason of this heating step. The grinder grinds said material to a particle size of substantially one to two millimeters, with some larger particles and with a substantial portion of even finer powdered material mixed with these one to two millimeter particles. Due to their low percentage of water, as 15%–20% of water by weight, these particles are free-flowing.

While not limited thereto, it is highly preferable especially in processing animal manure, to heat and dry and grind such starting material as soon as possible after it has been voided. This prompt heating and drying retains numerous valuable ingredients of the starting material, and prevents the rapid decomposition of the starting material by microorganisms after it has been blended with inorganic materials to produce the improved organo-mineral fertilizer.

The prompt heating and drying makes the soluble colloidal matter irreversible, and the residual insoluble organic matter becomes still more insoluble in water. Also, the heating and drying step actually conserves as much as 60% to 80% of the soluble organic material which is lost under present wasteful methods of storing, composting, or otherwise handling organic material. Such heating and drying is conducted at a temperature which preferably preserves the hormones and vitamins of fresh animal manure, and also prevents the conversion of organic compounds of phosphorus therein to less available inorganic compounds.

While it is preferred to perform all the steps disclosed herein in a continuous process, the invention is not limited thereto. Thus, the materials which result from this heating and drying and grinding in Step No. 1, may be stored.

If fresh pig manure, as one example, is mixed with water or with said 0.2% aqueous solution of sodium hydroxide, at 20° C. to 25° C., a considerable amount of brown colloidal matter is immediately extracted. By heating and drying the pig manure as above described, the quantity of extractable material, either with water or with said test solution of sodium hydroxide, is markedly decreased. This results from the irreversible state of the colloidal matter. Almost all of the original soluble organic materials become insoluble or substantially insoluble in water. The residual water-insoluble organic materials are also favorably influenced by the drying and heating, especially the rate of decomposition by sodium hydroxide. This rate of decomposition by said 0.2% aqueous solution of sodium hydroxide may be 20% to 50% of the normal rate of decomposition of the residual insoluble matter of the unheated material.

The resistance of the heated and dried material to leaching by water, because of the irreversibility factor mentioned earlier, and the reduced rate of decomposition of the residual insoluble organic matter resulting from the said heating and drying, are valuable elements of the process of producing the new type of organo-mineral fertilizer. These features diminish the rate of leaching by rainwater and the decomposition of the organic matter when it is added to the soil, with a resultant low rate of evolution of carbon dioxide, thus preventing an excessive accumulation of evolved carbon dioxide in the rhizosphere. The maximum concentration of carbon dioxide in the rhizosphere is preferably not to exceed one-tenth percent by weight of the soil air. A higher concentration of carbon dioxide injures or poisons the roots. When fresh animal manure is put into the soil, the concentration of evolved carbon dioxide in the rhizosphere may be as high as two percent by weight of the air in the rhizosphere.

The slow evolution of carbon dioxide in the soil from heat-dried material by the induced irreversible reactions prevents the exhaustion of oxygen in the rhizosphere.

The preferred slow evolution of carbon dioxide in the soil, with resultant gradual small rate of supply of carbon dioxide from the soil because of the irreversibility of the colloids and humate formation, enables the part of the plant which is above the soil to use the evolved carbon dioxide efficiently in the process of photosynthesis.

The irreversible state of the colloidal matter and the formation of insoluble humates of calcium, with the resultant slow decomposition in the soil, also results in more residual humus in the soil, which is important in improving the structure of the soil. In this manner, the water-retention, percolation, aeration, and the ion-exchange capacity of the soil are improved. Thus, there is a greater potential source of slowly available nutrients. As stated above, 60% to 80% of the valuable ingredients lost under the old fashioned system of handling organic manures are preserved by the operations involved in the preparation of the products manufactured by the methods of the invention.

The ground material is designated as End-Product No. 1, or EP-1.

STEP NO. 2

This step results in End-Product No. 2, also designated as EP-2.

EP-2 is an organo-mineral fertilizer which combines the advantages of organic and mineral plant nutrients, with little or none of the disadvantages of the organic and inorganic nutrients when said nutrients are used singly.

EP-1 is mixed with a selected quantity of finely divided well-known mineral ingredients or mixed fertilizers, such as sodium nitrate, ammonium sulphate, potassium chloride, ammoniated superphosphate, 1—2—1, 1—3—1 fertilizer grades, etc., in the ratio of 25% to 50% or more of EP-1 to the total weight of the final organo-mineral fertilizer product. The quantity and selection of these mineral fertilizer grades will depend upon the respective crop, method of fertilization, and soil type.

This mixing is done, while also adding and intermixing water, in a rotating drum so that the ingredients are thoroughly and uniformly mixed to a granular state of specific particle size depending upon the use of the final product. If necessary, enough finely divided dolomitic limestone may be added to maintain a neutral or slightly alkaline pH of 7.0 to 7.5. The addition of water is an important step. This added water makes it possible for the added inorganic fertilizer to react with the particles at the surfaces of the particles, in order to form the desired separate granules.

This mixing results in the formation of granules whose size may be selected by manipulating the proportion of water in the mixture. Said method and means for uniformly mixing and granulating said ingredients are well known and require no illustration. The granules which are thus formed may have a size of 0.5 to 2.0 or more millimeters, the size depending on the type of machinery which is used for applying the granules to the soil.

During said mixing and the formation of said granules, some of the water-soluble mineral salts begin to react with the organic starting material to form organo-mineral gels which serve the purpose of holding together the ingredients and coating the granules. The original water-soluble colloidal organic material therein, which is in the reversible and irreversible state, and the newly formed gels, are especially capable of entering into physical, chemical, and physico-chemical reactions and thereby produce constituents which turn the mechanical mixture into a physical unit with some chemical changes and new properties.

It is possible that the mixture may not be absolutely coated by the powder of the EP-1 and the organic gels, and the crystals of the added mineral ingredients may be exposed at the surfaces of said granules and thus go into solution too rapidly. In order to eliminate said exposed surfaces and further to retard the decomposition of said granules in the soil, and to retard the release of the soluble mineral salts and to provide their gradual release when said granules are suitably moistened with water in the soil, it is preferable to provide said granules with a special coating.

Such coating is made of EP-1, ground to an almost impalpable powder of a particle size of 0.044 millimeter and less, mixed with 0.15% of ammonium nitrate and an adhesive, such as a resin, gum, glue, or plastic, which is soluble in water or some other suitable solvent. This coating solution is sprayed on the granules as they are about to enter a drying chamber. This operation gives a thin coating, which is semipermeable to water, after drying. The drying temperature is to be high enough, such as between 100° C. and 150° C., to ignite some crystals of the ammonium nitrate, thereby slightly charring the surface of the granules. This operation gives stability to the granules so that when in contact with water for several months, they do not slake. This coating operation enhances the physical, chemical, physico-chemical and biochemical reactions which give the new product specific properties highly desirable for a gradual and efficient supply of nutrients to the roots. As the product leaves the drying chamber a mist spray is applied, consisting of an infusion of an active microbial flora.

*Preparation of soil infusion*

An infusion solution is obtained from a rich soil inherently endowed with an active soil microbial flora. This soil and the infusion obtained from it are treated in a special manner, as described below, so that the infusion will enhance and supplement the reactions which are designed to increase the desirable properties of the new type of organo-mineral fertilizer and other products.

This selected soil, prior to being used as a culture medium, is treated with dolomitic limestone to provide a mixture which is slightly acid to neutral, with a pH of 6.5 to 7.0. A high magnesium dolomitic stone is preferred. The soil is then moistened with an aqueous nutrient solution which has the necessary nitrogen, phosphorus, and potassium which are essential for the microorganisms to propagate.

The aqueous nutrient solution contains, besides the dissolved ingredients mentioned above, added traces of dissolved salts of boron, manganese, copper and zinc. In general, the nutrients supply is one part of nitrogen, calculated as nitrogen, to two parts of phosphorus, calculated as phosphorus pentoxide, to one part of potassium, calculated as potassium oxide.

The soil culture medium, which is thus moistened and enriched with said inorganic nutrients, has enough organic nutrients as a source of energy for the soil microflora. The proliferation of the desired microorganisms in the moistened and enriched soil culture medium is favored by the neutral or slightly acid soil condition of the mixture of soil and dolomitic limestone.

The moistened and enriched soil is kept under cover at a temperature of substantially 20° C. to 25° C., for five to ten days. During this proliferation period, said moistened and enriched soil culture medium is not exposed to direct sunlight.

At the end of said proliferation or incubation period, the soil is air dried to about 5% to 7% by weight of water. This moisture content is equivalent to the so-called hygroscopic coefficient or double the hygroscopic coefficient, but is below the point of vigorous activity of most microbes.

The soil is then extracted with an aqueous or other solution of 0.1% to 0.25% by weight of a carbohydrate, such as molasses or starch, which is to serve as a source of energy when these naturally selected organisms, sprayed on the EP-2 organo-mineral fertilizer as described, will reach the soil. Enough sodium carbonate or potassium carbonate is added to this extracting solution, to give it a pH of 6.5 to 7.5.

One part by weight of the dried soil culture medium is extracted with five parts of said aqueous or other extracting solution, which represents the special type of infusion, as stated below.

This extracting solution is thus provided with the desired microorganisms in strong and active condition. The extracting solution also extracts into suspension the dead bodies of the microorganisms which have died in the soil medium during the proliferation period, and the water-soluble ingredients of said soil medium. These provide nitrogen and phosphorus for the organisms for immediate use when they reach the soil, either in the ground manure, the organo-mineral fertilizer, or soil conditioner.

The maximum weight of said infusion added is preferably 3% to 5% of the weight of said ground material, or of any other product made according to this invention.

The material thus produced is designated as EP-2. It is a stable material, due to its low percentage of water, and it may be stored without the danger of decomposition and deterioration. No conditioning agents are necessary to maintain the EP-2 in good mechanical condition. No curing of this organo-mineral fertilizer is necessary.

When put into the soil the organo-mineral fertilizer becomes active when moistened, stimulating the microorganisms therein, forming organic gels which impede the rapid release of the water-soluble salts. Under such conditions the EP-2, in contact with seeds, stimulates their germination, whereas contact with ordinary organic and inorganic fertilizer mixtures may inhibit such germination. EP-2 will not burn plant roots by contact whereas pure mineral fertilizer may do so. EP-2 is advantageous in promoting the establishment of transplants. It decomposes slowly in the soil, with the desired slow rate of evolution of carbon dioxide. As the granules decompose, their absorptive capacity for water increases, thus attracting more water by capillary forces.

When more soil moisture comes in contact with the EP-2, the formation of organo-mineral gels is accelerated, giving rise to amorphous precipitates which provide additional membrane coatings that retard the leaching of the nutrients and thus regulate their release and retention. The physical, chemical, physico-chemical, and biochemical reactions and transformations (as a result of the invoked activity of the selective microflora) mentioned earlier are enhanced still farther at this point.

Water extracts of organo-mineral fertilizers prepared according to the procedures of the invention were compared with water extracts of organo-mineral mechanical mixtures of similar compositions. The former retained up to 38.4% more P, up to 22% more K and similar amounts of nitrates, ammonia and chlorides.

Comparative leaching tests of soils containing the mechanically mixed fertilizers and those containing the coated granules of EP-2, after 48, 72, and 120 hours have shown that practically no organic material and much less mineral salts are leached out of said granules of EP-2.

After 10 to 20 days in the soil, the said coated granules of EP-2 contained 20% to 45% more available phosphorus than the ordinary mechanically mixed organo-mineral fertilizer. Greater quantities of the soluble salts of nitrogen and potassium are retained in the granules than in the ordinary mechanically mixed fertilizers.

The slow, regulated, and uniform decomposition of EP-2 in the soil provides a steady and uniform supply of organic and inorganic plant nutrients in proper portion. The slowly and uniformly decomposing initial organic material of EP-2 exerts a buffer effect, which also regulates the supply of the plant nutrients.

When the organo-mineral granules absorb sufficient water from the soil, the microorganisms in EP-2 become more and more active. They feed initially on the readily available carbohydrate which is supplied by the infusion and on the supply of readily available nitrogen, phosphorus, and potassium, thus delaying the vigorous attack upon the organic ingredients. This maintains the desired slow rate of decomposition of EP-2 and the desired slow rate of evolution of carbon dioxide, thus preventing the depletion of oxygen in the rhizosphere and avoiding root poisoning. At the same time it furnishes during the growing season a uniform supply of carbon dioxide nutrient to the air immediately above the soil for the plants, supplying in toto 50% to 60% more of this nutrient than the manures and composts which are treated by the old methods. There is indirect evidence that the natural organic fraction of the soil is utilized prior to the active utilization of the organic fraction of the organo-mineral fertilizer.

The vigorous living microorganisms in the EP-2 also exert strong antibiotic activity, which inhibits undesirable microorganisms.

I believe that the use of EP-2 results in a more vigorous non-symbiotic fixation of nitrogen and more active symbiotic nitrogen fixation flora when legumes are grown.

The coatings formed, as described, act as membranes which are permeable or semipermeable to water. These membranes retard the leaching of material out of the granules, thus exercising control in releasing the soluble nutrients from the new type of organo-mineral fertilizer and regulating the decomposition of the organic matter, conserving the latter and preventing excesses of carbon dioxide and providing a desired flow of this gas over the period of the growing season.

A modification of the steps involved in producing the organo-mineral fertilizer described is to mix the wet organic materials and mineral salts, except the nitrogenous materials containing ammonia or nitrate, dry the mix and grind it. Ammonia and nitrate salts coated with dolomitic limestone can then be added after grinding. This modification leads to a more intimate mixture and gives a more favorable material for the operation of preparing the coating and stabilization of granules.

END-PRODUCT NO. 3

This end-product is designated as EP-3.

It is made by blending EP-1 with liming material or materials. It has some fertilizer action inasmuch as it supplies some nutrients, but the main action of EP-3 is to condition the soil. The liming materials may be any material used to improve the soil structure and to prevent acidity of the soil. Dolomitic limestone, hydrated lime, oyster shell lime, lime marl are examples of liming materials. Hydrated dolomitic lime is a mixture of calcium hydroxide and magnesium hydroxide. In addition to the lime, gypsum is added.

As one example of the blend of EP-3, 50% by weight of EP-1, in any particle size, is mixed with 30% of dolomitic limestone, 10% of gypsum, 7.5% of potassium-magnesium sulphate, 0.25% of borax, 1.5% of manganese sulphate, and 0.75% of copper sulphate.

The chief ingredients, the EP-1, the limestone and the gypsum, may vary in quantity, depending on the soil texture. For heavy soils (loams, silt loams, and clay loams) the EP-1 may be reduced to half the above proportion, and in its place the limestone and gypsum content may be increased in the ratio of four to one. The proportions of the other ingredients stay constant.

These minor ingredients of EP-3, as above formulated, protect the soil against immobilization of these minor elements in the soil. Such immobilization occurs when conventional liming ingredients are used. When the gypsum is added to the original fertilizer material and the mixture is heated as above described, substantially all the humates are converted to substantially water-insoluble calcium humates. However, when the soil infusion is added, the micro-organisms begin to produce more water-soluble humates. As above noted, the particles of EP-1 are moistened with water. The water-soluble humates which are formed react with the intermixed calcium compound or compounds, during the storage, to form substantially water-insoluble calcium humates in the particles.

The above mixture is preferably moistened with 10% to 15% by weight of water at 20° C. to 25° C., an infusion of microorganisms is added and the resultant product is then stored. While the mixture is moist and until it comes to moisture equilibrium of the open air, calcium humates are formed therein. The humates, which are originally soluble in water, rapidly become insoluble in water. The water-insoluble calcium humates, the limestone, and the organic matter impart stability to the soil structure. Until equilibrium is reached in moisture content, the decomposition of the organic matter is very negligible.

EP-3 can be used without enrichment with organo-mineral fertilizer (EP-2) which may be optionally added. EP-3, without such enrichment, is sufficient to give plants a good start. The readily available carbohydrate nutrient in EP-1 and other readily available organic materials in EP-1, supply organic anions for more of the reaction products of calcium with organic complexes. The calcium is supplied initially by the gypsum and later by the dolomitic limestone or hydrated lime. The decomposition products of EP-1 supply a well balanced nutrient supply for various crops that do not need large quantities of available nutrients at a rapid rate of supply.

The gypsum and copper salt precipitate undesirable organic toxins, particularly crenic acid and apocrenic acid. They also serve as coagulants and enter into reactions to form the desirable humates.

EP-3 improves the structure of the soil and provides better aeration and movement of water therein, which in turn provide conditions that are essential for high crop yields.

To increase the period of activity of the EP-3 it may also be subjected to the procedure of coating granules of the material as described for EP-2.

I have described a preferred embodiment of my invention, but numerous changes and omissions and additions and substitutions can be made without departing from its scope. Also, the invention includes not only the finished end products, but also intermediate products. The invention also includes steps and subcombinations of the complete processes disclosed herein.

It is noted that I heat-convert the organic material by dehydrating it at a temperature and during a selected heating period, so that the organic material is not substantially carbonized, so that the heat-converted organic material is substantially wholly available for use as a fertilizer.

I greatly prefer to treat the wet organic material, prior to drying, with finely divided gypsum or with calcium sulfate. Gypsum is a valuable liming ingredient. However, it is within the broad scope of the invention to use other calcium salts, in order to form calcium humates and other to treat the wet material with other metallic compounds, in order to form humates which are wholly insoluble or slowly insoluble in water when the treated organic material is dried or both dried and heated.

It is well known that partially decayed organic matter contains several humic acids, which can adsorb ammonia, and that the ammonia is removed by sprouting seeds, thus regenerating the humic acid or humic acids. By forming a salt of humic acid which has low solubility in water, the rate of this reaction is retarded. The gypsum or other substitute material is thoroughly mixed with the wet organic material prior to drying, or at the beginning of the drying step, so that such intimate mixture is heated and partially dehydrated, as described in Step No. 1.

As one example, when the finely divided EP-1 is mixed with mineral fertilizer material and water to form granules or pellets, and to react the water-soluble inorganic fertilizer with the organic starting material to form organo-mineral gels, the period of this reaction may be one minute. The percentage of added water affects the size of the granules or pellets. Adding more water results in larger granules or pellets.

In making pellets according to Step No. 2, the water can be added at substantially 20° C.–25° C. and the organo-mineral gels can be formed at this temperature.

Whenever I refer to dehydrating organic fertilizer material, I include an operation which partially dehydrates said organic fertilizer material.

When I refer to water-soluble colloidal material of organic fertilizer, I include colloidal material which can be extracted by water at 20° C.–25° C. from said organic fertilizer material, even though said extracted colloidal material does not form a true aqueous solution.

I have stated that the heat converts up to substantially 10% by weight of the original water-soluble colloidal material, in order to make said original water-soluble colloidal material inert to or insoluble in water. This ratio of 10% is calculated upon the weight of the original water-soluble colloidal material, and not upon the entire weight of the original organic fertilizer.

I claim:

1. A method which consists in proliferating live micro-organisms in wet soil which has a pH of substantially 6.5 to 7.0 and which has the necessary nutrients for said micro-organisms, including organic nutrient and also including inorganic nitrogen nutrient and inorganic phosphorus nutrient; proliferating said micro-organisms in said soil at substantially 20° C.–25° C. during a period of substantially five to ten days while shielding said soil from direct sunlight and while consuming only a part of said inorganic nutrient and of said organic nutrient; thus providing soil which has live micro-organisms in strong and active condition and which has the dead bodies of the micro-organisms which have died in said soil during said period; drying said wet soil at the end of said period to a maximum of substantially 5% to 7% by weight of water; extracting said dried soil with an aqueous solution which has substantially at least 0.1% to 0.25% by weight of a nutrient carbohydrate for said live micro-organisms, said aqueous solution having a pH of substantially 6.5 to 7.5, thus producing an extract which contains said live micro-organisms and said dead bodies and unconsumed water-soluble nutrient ingredients of said soil, a sufficiently low proportion of water being used in said extract to make said extract stable to live micro-organisms.

2. A method of making an organo-mineral fertilizer from natural organic fertilizer material which contains original humates and added water-soluble mineral fertilizer, said organic fertilizer material having original water-soluble colloidal material; which consists in adding gypsum to said organic fertilizer material while said fertilizer material has enough water to react its original humates with said gypsum to form a modified fertilizer material which has calcium humates; the weight of the gypsum being substantially 2.5% to 3.0% of the weight of said organic fertilizer material; heat-drying said modified fertilizer at substantially 1800° F. to produce a heat-dried fertilizer material whose percentage of water is sufficiently low to make said heat-dried fertilizer material stable to live micro-organisms; said heat-drying converting a major part of said colloidal material permanently to the water-insoluble state; granulating said heat-dried fertilizer material in the form of small particles with finely-divided and water-soluble mineral fertilizer and added water to form a final product which consists of granules; and forming organo-mineral gels of said heat-dried fertilizer material and of said mineral fertilizer in said granules during said granulating; providing said granules with coatings which are semi-permeable to water when said coatings are dry, said coatings being initially formed by applying a coating composition to said granules; said coating composition consisting substantially of water and ammonium nitrate and a water-soluble adhesive and said heat-dried fertilizer product in fine-particle form; and heat-drying said wet-coated granules at substantially 100° C. to 150° C. to ignite some of said ammonium nitrate and to char the dry granules and to provide the above-mentioned coatings which are semi-permeable to water in the dry state, said heat-dried and coated granules having a sufficiently low percentage of water to be stable to live micro-organisms.

3. As a new granular fertilizer product, organo-mineral fertilizer in the form of granules; said granules consisting substantially of water-soluble mineral fertilizer combined with a heat-dried natural organic fertilizer material heat-dried at substantially 1800° F.; said mineral fertilizer being thus combined in said granules with said heat-dried organic fertilizer material in the form of organo-mineral gels; said heat-dried organic fertilizer product being the heat-dried residue of a natural modified organic fertilizer material, said modified organic fertilizer material having substantially all of its humates in the form of calcium humates; said heat-dried organic fertilizer product having a sufficiently low percentage of water to make it stable to live micro-organisms and a major part of its colloidal material heat-converted to permanently water-insoluble state, said granules having a sufficiently low percentage of water to be stable to live micro-organisms, said granules having dry charred coatings which are semi-permeable to water.

4. As a new granular fertilizer product, organo-mineral fertilizer in the form of granules; said granules consisting substantially of water-soluble mineral fertilizer combined with a heat-dried natural organic fertilizer material heat-dried at substantially 1800° F.; said mineral fertilizer being thus combined in said granules with said heat-dried organic fertilizer material in the form of organo-mineral gels; said heat-dried organic fertilizer product being the heat-dried residue of a natural organic fertilizer material which has original water-soluble colloidal material; said heat-dried organic fertilizer product having a sufficiently low percentage of water to make it stable to live micro-organisms and a major part of said colloidal material heat-converted to permanently water-insoluble state, said granules having a sufficiently low percentage of water to be stable to live micro-organisms, said granules having dry charred coatings which are semi-permeable to water, said dry charred coatings consisting substantially of particles of said heat-dried organic fertilizer material and ammonium nitrate and a water-soluble adhesive.

References Cited in the file of this patent

UNITED STATES PATENTS

| | | |
|---|---|---|
| 1,320,701 | Manns | Nov. 4, 1919 |
| 2,043,265 | Roeder | June 9, 1936 |
| 2,093,047 | Hudig et al. | Sept. 14, 1937 |
| 2,735,756 | Farber | Feb. 21, 1956 |

FOREIGN PATENTS

| | | |
|---|---|---|
| 501,282 | Great Britain | Feb. 23, 1939 |